March 13, 1962    E. J. BETZOLD, JR., ET AL    3,025,404
RADIATION DETECTOR PROBES
Filed May 14, 1958
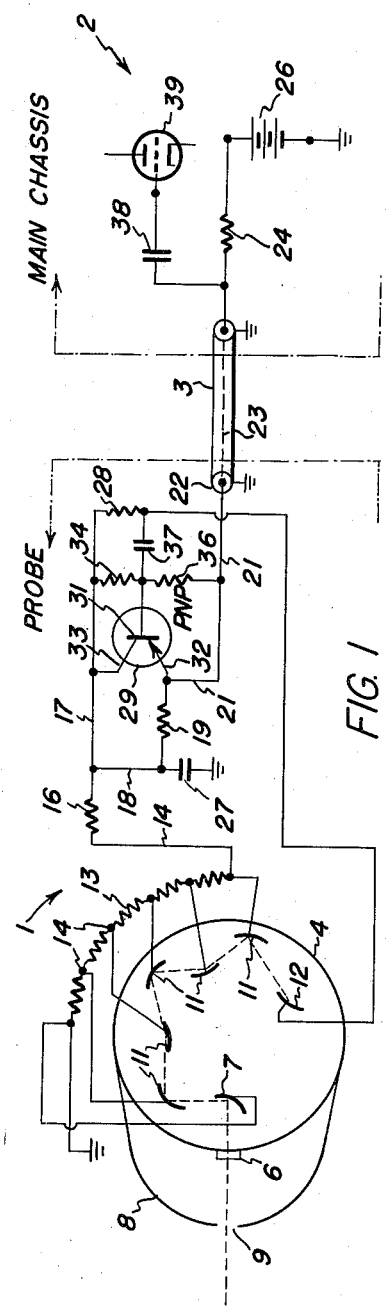
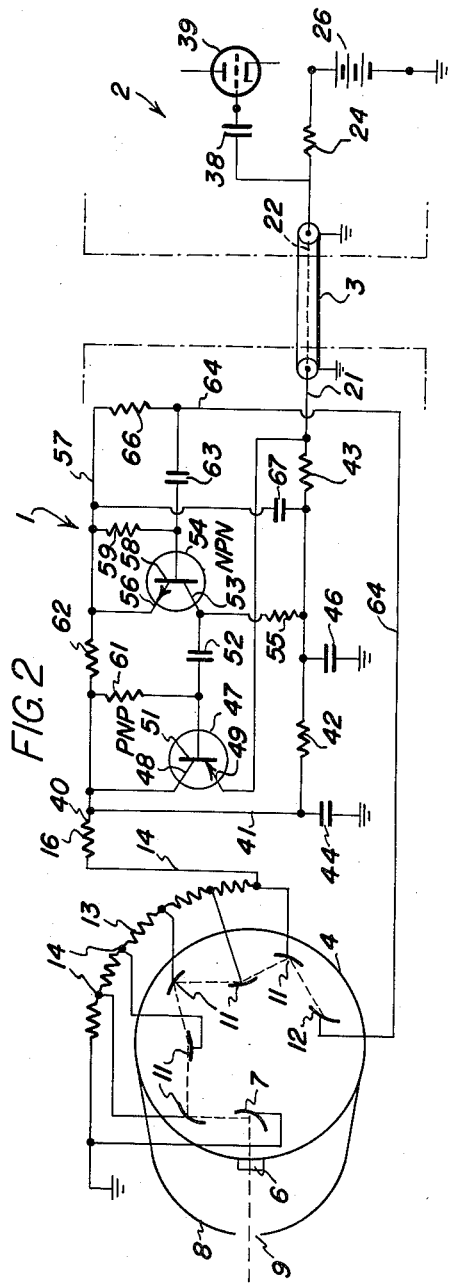
INVENTORS
EDWARD J. BETZOLD, JR.
JACK H. CROW
BY Hurwitz & Rose
ATTORNEY

United States Patent Office 3,025,404
Patented Mar. 13, 1962

3,025,404
RADIATION DETECTOR PROBES
Edward J. Betzold, Jr., St. Louis, Mo., and Jack H. Crow, Sarasota, Fla., assignors to Nuclear Corporation of America, Inc., Denville, N.J., a corporation of Delaware
Filed May 14, 1958, Ser. No. 735,219
6 Claims. (Cl. 250—207)

The present invention relates to signal probes and more particularly to a light weight and portable scintillation detector probe which may be connected to a measuring and recording instrument by only a single coaxial cable.

The increasing utilization of scintillation measuring and detecting equipment, particularly in the field of biology, chemistry and medicine, has created a demand for a scintillation detector probe, which may be easily and quickly moved to various locations about an object or individual that constitutes the subject of the investigation. In order to fulfill such requirements, the probe must be light in weight; must provide sufficient amplitude of signal to insure an adequate signal-to-noise ratio; must be small in size and must utilize a cable for connecting it to the main instrument that is of minimum weight and maximum flexibility.

It is, therefore, an object of the present invention to provide a scintillation detector probe including a scintillation crystal and photo-multiplier tube and further including a pre-amplifier having sufficient gain to insure a suitable signal-to-noise ratio.

It is another object of the present invention to provide a relatively small and light weight scintillation detector probe including a scintillation crystal, a photomultiplier tube and a transistorized signal pre-amplifier; which probe does not require a separate source of voltage and which may be connected to a main instrument by means of a single coaxial cable.

It is yet another object of the present invention to provide a portable and light weight scintillation detector probe including a scintillation detector and a pre-amplifier wherein the detector and pre-amplifier receive their operating voltages over a coaxial cable from a main measuring and recording instrument and wherein the pre-amplifier applies amplified signal voltages to the measuring and recording instrument over the aforesaid coaxial cable.

In accordance with the present invention, there is provided a scintillation detector probe having a photo-multiplier tube and a transistor pre-amplifier. The probe is connected to a main measuring and recording instrument by means of a single coaxial cable which is adapted to supply operating voltages to the photo-multiplier tube and the pre-amplifier.

A resistor is connected in series with the high voltage circuit of the probe to provide D.C. operating voltages for both the photo-multiplier tube and the transistor amplifier. The resistor is by-passed for signal frequencies so that it appears as a battery so far as the signal circuits are concerned. The transistor pre-amplifier is connected in series with the aforesaid resistor and the high voltage supply lead and constitutes an impedance element in series with the supply circuit. Current flow through the transistor is an amplifier function of the signal applied to its base and in consequence the transistor in the aforesaid circuit operates as a variable impedance in series with the voltage supply line. A further resistor is connected in series with the high voltage supply in the main instrument so that the variation in impedance of the transistor in response to signal voltages generated by the multiplier tube produces a variation in current in the voltage supply circuit. The variation in current in the voltage supply circuit generates a signal across the latter resistor which may be applied to a main amplifier circuit contained in the measuring and recording instrument.

In a further embodiment of the invention, the probe may also contain a transistor voltage amplifier, the output voltage of which is employed to drive the aforesaid transistor amplifier connected in series with the high voltage supply lead. Various signal by-passed resistors are connected in the voltage supply lead so that the operating potentials for the voltage amplifier may be readily obtained. The transistor power amplifier is again connected in series with the voltage lead in order to control current in the line in accordance with detected radiation.

The invention has been described as applicable to a scintillation detector probe utilizing a photo-multiplier tube. It is equally applicable to a detector probe utilizing an electron-multiplier tube having a cathode sensitive to other forms of radiation.

It is, therefore, another object of the present invention to provide a radiation detector probe including an electron-multiplier tube and a transistor power amplifier connected in series with a high voltage supply lead of a coaxial cable which couples the probe to a main measuring and/or recording instrument.

It is still another object of the present invention to provide a portable, light-weight and rugged scintillation detector probe employing a minimum number of circuit elements and providing a relatively high signal-to-noise ratio.

The above and still further objects, features and advantages of the present invention will become apparent upon consideration of the following detailed description of one specific embodiment thereof, especially when taken in conjunction with the accompanying drawings, wherein:

FIGURE 1 of the accompanying drawings is a schematic circuit diagram of the probe of the present invention; and FIGURE 2 is a schematic circuit diagram of another embodiment of the probe of the present invention.

Referring specifically to FIGURE 1 of the accompanying drawings, there is provided a scintillation detector probe generally designated by the reference numeral 1, a main chassis unit generally designated by the reference numeral 2 and a coaxial cable 3 interconnecting the probe unit 1 and the main chassis unit 2. The probe unit 1 constitutes a photo-multiplier tube 4 having a scintillation crystal 6 secured to its end face adjacent a photo-cathode 7 of the multiplier tube 4. The photo-cathode 7 and scintillation crystal 6 are provided with a light and radiation shield 8 having an opening 9 which permits radio-active emanations to pass through the shield 8 and strike the scintillation crystal 6. The shield 8 prevents radiation of the intensity to be examined, from striking the crystal 6 other than through the aperture 9 and prevents light other than that emitted by the crystal 6 from striking the photo-cathode.

The photo-multiplier tube is further provided with a plurality of dynodes 11 and a collector electrode or anode 12. The operating voltages for the dynodes 11 are derived from a resistor 13 having a plurality of substantially equally spaced taps 14, each dynode being connected to a different tap 14. One end of the resistor 13 is connected to chassis ground as is the photo-cathode 7, while the high voltage tap 14 of the resistor 13 is connected to a resistor 16. The end of the resistor 16 remote from the tap 14 is connected to a voltage bus 17 and via the bus 17 and lead 18, resistor 19 and lead 21 to a central conductor 22 of the coaxial cable 3. The coaxial cable 3 further comprises an outer conductor 23 which is connected to the chassis of the probe unit 1 and the main chassis 2. The center conductor 22 of the cable 3 is connected via a resistor 24 to the positive high voltage terminal of the main chassis voltage source 26 which may be a battery, as illustrated, or a rectified voltage source.

The voltage bus 17 is connected to chassis ground through a by-pass capacitor 27 which by-passes signal voltages around the resistors 13 and 16 to ground, so that the voltage on the bus 17 and the voltages across the resistors 13 and 16 do not vary with variations in intensity of the signals developed in the photo-multiplier tube 4. The collector or main anode 12 of the photo-multiplier tube 4 is connected via a resistor 28 to the voltage bus 17. In consequence of the high voltage applied to the bus 17 a current flow is established through the resistors 13 and 16 to develop proper operating potentials on each of the dynodes and the photo-cathode 7 of the photo-multiplier 4. The relative values of the resistors 16 and 28 are such that the anode or collector 12 always remains positive with respect to the dynodes 11 and in the absence of light impinging upon the photo-cathode 7, the anode 12 is at the same potential as the bus 17. When radiation falls upon the scintillation crystal 9, and in consequence light impinges upon the photo-cathode 7, the photo-cathode 7 emits electrons and electron multiplication is effected by the dynodes 11. The electron cloud leaving the dynode 11 nearest to the anode 12 is attracted to the anode and the magnitude of this stream of electrons varies in accordance with the intensity of the light falling upon the photo-cathode 7. In consequence, a signal is developed across the resistor 28 which varies in accordance with the intensity of light impinging upon the photo-cathode 7 while the voltage bus 17 remains at a substantially fixed potential in consequence of the fact that signal voltages are by-passed around the resistors 13 and 16 by the by-pass capacitor 27.

In order to insure an acceptable signal-to-noise ratio for the instrument, it is essential to amplify the signal developed across the resistor 28 and this is effected in accordance with the present invention by means of a PNP type, common emitter connected transistor 29. The transistor 29 is provided with a base electrode 31, an emitter electrode 32, and a collector electrode 33. In order to establish proper operating potentials on the various electrodes of the transistor 29, there is provided a voltage divider connected between the leads 21 and 17 consisting of series connected resistors 34 and 36. The junction of the resistors 34 and 36 is connected to the base 31 of the transistor 29 while the emitter 32 is connected to the lead 21 and the collector 33 is connected to the voltage bus 17. In consequence of this arrangement, the collector 33 operates at a negative potential with respect to the base 31 and the emitter 32 operates at a positive potential with respect to the base, these being the correct operating polarities for a PNP type transistor. The junction of the resistors 34 and 36 and therefore the base 31 of the transistor 29 is electrically coupled to the anode 12 of the photo-multiplier tube 4 through a coupling capacitor 37.

In operation, since the base of the transistor 29 is coupled to the anode 12 of the photo-multiplier tube via the coupling capacitor 37, signal voltages developed across the resistor 28 are applied to the base electrode 31 of the transistor 29. It will be noted that the emitter-to-collector circuit of the transistor 29 is connected between the lead 21 and the voltage bus 17 and therefore is in parallel with the series connected resistors 34 and 36 and in parallel with the resistor 19. In the absence of conduction of the transistor the series impedance of the probe constitutes the resistance of resistors 13 and 16 plus the parallel resistance of resistor 19 and resistors 34 and 36 in series. The signals applied to the base of the transistor 29 are amplified by the transistor 29 and vary its conductivity between its emitter-to-collector. The transistor now appears as a resistance in parallel with the resistor 19 and therefore the impedance of the probe, as seen from the main chassis 2, is variably reduced in accordance with the signals developed at the anode 12 of the photo-multiplier 4. Variation in the impedance of the probe produces a variation in current through the resistor 24 and therefore produces a signal voltage at the junction of the resistor 24 and the center conductor 22 of the cable 3. This signal is coupled via a coupling capacitor 38 to an input amplifier stage 39 of the main chassis amplifier, not illustrated. The transistor 29 is employed as a power amplifier to produce a current variation through the resistor 24, and is further employed to match the impedance of the probe unit 1 to the impedance of the resistor 24. It is important to match the impedance of the output circuit of the probe unit 1 to the input impedance of the main chassis unit 2 since even after amplification, the signals produced by the probe unit are relatively small and unless impedance-matching is provided, the signal developed across the resistor 24 would not be large enough to maintain a desirable signal-to-noise ratio. More particularly, even though the tube 4 provides signal amplification of approximately one million, the signals developed on the anode 12 are of such low intensity that in the absence of further amplification, even though a low noise cable 3 is employed, the signal voltages would be difficult to distinguish from the noise voltages. The pre-amplifier 29 provides sufficient additional amplification to permit the signals to be distinguishable.

It will be noted that the utilization of the by-pass capacitor 27 effectively maintains the voltage of the voltage bus 17 at a fixed potential so that the resistor 16 appears to the circuit as a battery of fixed voltage. As a result, a separate source of voltage is not required for the probe unit 1 and leads, in addition to the signals leads, are not required for supplying the operating voltage to the probe.

It is apparent from the above that the probe of the present invention achieves its intended purpose of light weight, small size and maneuverability since in addition to the photo-multiplier tube 4 and the scintillation crystal 6, the only additional elements required in the probe are a few resistors and capacitors and a single transistor 29, all of which are relatively small in size, extremely light in weight and may be grouped about the base of the tube 4 to form a compact unit.

In a second embodiment of the invention illustrated in FIGURE 2 of the accompanying drawings, there is provided a probe unit having a stage of voltage amplification in addition to the stage of power-amplification, so as to increase the signal-to-noise ratio of the instrument. Referring specifically to the schematic circuit diagram illustrated in FIGURE 2, there is again provided a main chassis 2 having a source of high potential 26 and an input stage 39 of a main chassis amplifier. The positive voltage terminal of the voltage source 26 is coupled via the resistor 24 to the center conductor 22 of the coaxial cable 3 interconnecting the main chassis 2 and the probe unit 1. The probe unit 1 is again supplied with a photo-multiplier tube 4 having a photo-cathode 7, a plurality of dynodes 11 and an anode 12. The scintillation crystal 6 is secured to the front surface of a photo-multiplier tube 4 in such a position as to direct light emitted thereby onto the photo-cathode 7. The dynodes 11 are connected to the terminals or taps 14 of the dropping resistor 13 and the ungrounded end of the resistor 13 is connected via a lead 14 to one end of a resistor 16. The end of the resistor 16 which is remote from the lead 14 is connected via a series circuit comprising a lead 41, a resistor 42 and a resistor 43 to the lead 21. The junction of the lead 41 and the resistor 42 is connected to ground via a signal by-pass capacitor 44 and the junction of the resistors 42 and 43 is coupled to ground via a signal by-pass capacitor 46. A power transistor 47 has its collector electrode 49 connected to the lead 21. A base electrode 51 of the transistor 47 is connected via a coupling capacitor 52 to a collector electrode 53 of an NPN type voltage amplifying transistor 54. The collector electrode 53 is provided with a load resistor 55 connected between the collector and the junction of resistors 42 and 43. The transistor 54 further comprises an emiter electrode 56 connected to a further voltage bus 57 and a base electrode 58 connected via a biasing resistor 59 to the voltage bus 57. The transistor 47 is biased by a resistor 61 connected between its base electrode 51 and the voltage bus 40. The voltage buses 57 and 40 are connected together through a resistor 62 while the base electrode 58 of the transistor 54 is connected via a signal coupling capacitor 63 to a lead 64 connected to the anode 12 of the photo-multiplier tube 4. The lead 64 is connected via a resistor 66 to the voltage bus 57 and the voltage bus 57 is connected to the junction between the resistors 42 and 43 by means of a signal by-pass capacitor 67. In consequence of the utilization of the capacitors 44, 46 and 67, the voltages on the buses 40 and 57 and at the junction between the resistors 42 and 43 do not vary with the signals developed across the photo-multiplier tube 4, and constitute in consequence fixed voltage sources.

In operation, light impinging upon the photo-cathode 7 of the photo-multiplier tube 4 produces a variable electron flow to the anode 12 to produce a signal voltage on the lead 64. The signal on the lead 64 is coupled via the signal coupling capacitor 63 to the base electrode 58 of the transistor 54. The transistor 54 is connected as a voltage amplifier so that an amplified signal voltage is developed across the load resistor 55 of the transistor 54. There is a reversal of phase of the signal through the transistor 54 so that it is necessary in interpreting the information developed by the probe unit 1 of FIGURE 2 to take into account that the phase of the output signal is reversed 180° with respect to the signal produced by the unit of FIGURE 1, if the phase of the signal is of any consequence in the final measurement.

The signals developed across the resistor 55 are coupled via the signal coupling capacitor 52 to the base of the transistor 57 whose operation is identical with that of the transistor 29 in the embodiment of the invention illustrated in FIGURE 1. Specifically, the transistor 47 constitutes a variable impedance in series with the resistor 16 and resistor 24 and in consequence, the variation of the apparent impedance of the proble 1, produces amplified voltage signals across the resistor 24. It is an important feature of this embodiment of the invention, that the transistor is in series with the resistors 13, 16 and 24 only. The amplitude of the signal produced across the resistor 24 is a function of the percentage change in resistance of the circuit in series therewith. In consequence, it is essential to maintain the total fixed impedance of the circuit as close as possible to the effective variation in impedance of the transistor 47. In the circuit of FIGURE 2, even though a full stage of voltage amplification is added, the fixed impedance in series with the transistor 47 is substantially the same as that in series with the transistor 29 in the circuit of FIGURE 1 so that the full benefit of the increased magnitude of the voltage applied to the base of the transistor power amplifier, resulting from utilization of the voltage amplifier 54, is available.

Returning now to the description of operation of the circuit of FIGURE 2 of the accompanying drawings, the signals developed across the resistance 24 are applied via the coupling capacitor 38 to the input stage 39 of the main voltage and/or power amplifier of the instruments on the main chassis unit 2.

In the embodiment of the invention illustrated in FIGURE 2, the additional components required to provide an additional stage of voltage amplification are quite few in number and therefore do not appreciably increase the weight or size of the probe or the cost of fabrication or maintenance of the unit.

The probe unit has been described as employing a scintillation crystal and photo-multiplier tube. There are available today various types of ion or electron multiplier tubes which are quite similar to the photo-multiplier tube and differ only with regard to the source of signal electrons and the present invention is equally applicable to these other types of multiplier tubes.

While we have described and illustrated two specific embodiments of our invention, it will be clear that variations of the general arrangement and of the details of construction which are specifically illustrated and described may be resorted to without departing from the true spirit and scope of the invention as defined in the appended claims.

What we claim is:

1. A detector probe comprising an electron multiplier tube having a cathode, an anode and a plurality of dynodes, a voltage divider network for developing a plurality of distinct voltages, means connecting said cathode and said dynodes each to receive a different voltage from said network, a pair of electric conductors, an end of said network being connected to one of said conductors and the other end being connected at least through a first resistor to the other of said conductors, a first impedance, means connecting said anode through at least said first impedance to said other conductor, means for by-passing said network and said first resistor at the frequency of signals developed across said first impedance, a transistor having a collector, an emitter and a base electrode, means connecting said collector and said emitter of said transistor in series between said other conductor and said first resistor, means for applying signals developed across said first impedance to said base electrode and means for connecting said conductors across a source of voltage remote from said probe.

2. A detector probe comprising an electron multiplier tube having a cathode, an anode and a plurality of dynodes, a voltage divider network for developing a plurality of distinct voltages, means connecting said cathode and said dynodes each to receive a different voltage from said network, a pair of electric conductors, an end of said network being connected to one of said conductors and the other end being connected at least through a first resistor to the other of said conductors, a first impedance, means connecting said anode through at least said first impedance to said other conductor, means for by-passing said network and said first resistor at the frequency of signals developed across said first impedance, a transistor having a collector, an emitter and a base electrode, means connecting said emitter and said collector of said transistor in series between said other conductor and said first resistance, a further voltage divider, a transistor voltage amplifier for amplifying signals developed across said first impedance, means for developing operating potentials for said voltage amplifier across said further voltage divider, means for applying amplified signal voltages to said base electrode of said first mentioned transistor and means for connecting said conductors across a source of voltage remote from said probe.

3. In a measuring instrument having a main chassis including a source of voltage connected in series with a resistance across a coaxial cable receptable, and an amplifier input circuit coupled to an end of the resistance remote from the source, a probe unit comprising an electron multiplier having an anode and a plurality of secondarily emissive electrodes, a pair of conductors, a first resistance, a voltage divider network connected in series with at least said first resistance across said conductors, mean for connecting said electrodes to said divider network so that each electrode receives a different voltage, a load impedance means connecting said anode through said load impedance to one of said conductors, means for by- passing said first resistor and said divider network at the frequency of signals developed across said load impedance, a further network connected in series between said first resistance and said one of said conductors, said further network including a transistor having a collector-emitter circuit and a base electrode, means connecting said collector-emitter circuit in series with said first resistor, means for applying signals developed across said load impedance to said base electrode, and mean for connecting said conductors across a coaxial cable.

4. The combination according to claim 3, wherein said means for applying signals comprises a transistor voltage amplifier, and further comprising voltage divider means connected in series with said conductors for developing proper operating voltages for said transistor voltage amplifier.

5. A radiation detector including a main chassis, a probe, and a coaxial line interconnecting them; said main chassis including a coaxial terminal, a resistor, means for supplying direct current to the coaxial terminal through the resistor, and an alternating current signal amplifier also coupled to the shielded coaxial terminal to receive and amplify signals from the probe; and said probe comprising an electron multiplier tube, having an anode, a cathode and a plurality of dynodes, first resistance network means for supplying respectively different D.C. voltage levels to the electrodes of the electron multiplier tube, a transistor, second resistance network means connected from said coaxial lead in series with said first network for supplying biasing potentials to said transistor, the emitter-to-base circuit of said transistor being connected in parallel with said second network, means for applying signals from the anode of said multiplier tube to the base of said transistor, and means for decoupling said first network from signals from said transistor.

6. A radiation detector including a main chassis, a probe, and a coaxial line interconnecting them; said main chassis including a coaxial terminal, a resistor, means for supplying direct current to the coaxial terminal through the resistor, and an alternating current signal amplifier also coupled to the shielded coaxial terminal to receive and amplify signals from the probe; and said probe comprising an electron multiplier tube, having an anode, a cathode and a plurality of dynodes, first resistance network means for supplying respectively different D.C. voltage levels to the electrodes of the electron multiplier tube, a transistor, second resistance network means connected from said coaxial lead in series with said first network for supplying biasing potentials to said transistor, two electrodes of said transistor being connected in parallel with at least a portion of said second network, means for applying signals from the anode of said multiplier tube to an input electrode of said transistor, and means for decoupling said first network from signals from said transistor.

References Cited in the file of this patent

UNITED STATES PATENTS

| | | |
|---|---|---|
| 2,617,042 | Wouters | Nov. 4, 1952 |
| 2,688,703 | Giovanni et al. | Sept. 7, 1954 |
| 2,742,576 | Dandl | Apr. 17, 1956 |
| 2,758,217 | Scherbatskoy | Aug. 7, 1956 |
| 2,822,479 | Goldsworthy | Feb. 4, 1958 |

OTHER REFERENCES

Transistorized Scintillation Counter by Kueper, Radio-Electronics, March 1957, pages 34 to 37.

Transistorized Radiation Survey Instruments by Spears, Nucleonics, June 1957, pages 100 to 102.

Transistorized Photomultiplier Has 0.1-$\mu$u Sec. Resolution by Brunson, Nucleonics, vol. 15, No. 7, July 1957, pages 86 and 87.